US012792313B2

(12) United States Patent
Matousek

(10) Patent No.: US 12,792,313 B2
(45) Date of Patent: Nov. 10, 2026

(54) HOT RELOAD EDIT DETERMINATION AT RUN TIME

(71) Applicant: Microsoft Technology Licensing, LLC, Redmond, WA (US)

(72) Inventor: Tomas Matousek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 18/616,623

(22) Filed: Mar. 26, 2024

(65) Prior Publication Data

US 2025/0306862 A1 Oct. 2, 2025

(51) Int. Cl.

| | |
|---|---|
| ***G06F 9/44*** | (2018.01) |
| ***G06F 8/30*** | (2018.01) |
| ***G06F 8/656*** | (2018.01) |
| ***G06F 9/445*** | (2018.01) |
| ***G06F 9/45*** | (2006.01) |
| ***G06F 9/455*** | (2018.01) |

(52) U.S. Cl.

CPC ................ *G06F 8/31* (2013.01); *G06F 8/656* (2018.02)

(58) Field of Classification Search

CPC .................................. G06F 8/31; G06F 8/656

See application file for complete search history.

(56) References Cited

U.S. PATENT DOCUMENTS

| | | | | |
|---|---|---|---|---|
| 5,313,616 | A | 5/1994 | Cline | |
| 7,493,610 | B1 | 2/2009 | Onodera | |
| 9,823,902 | B2 * | 11/2017 | Arning | G06F 8/33 |
| 11,573,787 | B1 | 2/2023 | Hashimi et al. | |
| 11,847,433 | B2 | 12/2023 | Matousek et al. | |
| 2007/0285271 | A1 | 12/2007 | Erlingsson | |
| 2016/0062878 | A1 | 3/2016 | Westrelin | |
| 2018/0024911 | A1 * | 1/2018 | Kruszewski | G06F 8/447 717/125 |
| 2018/0260198 | A1 | 9/2018 | Jayaswal et al. | |
| 2018/0260304 | A1 | 9/2018 | Matousek et al. | |
| 2020/0026530 | A1 * | 1/2020 | Rose | G06F 9/547 |

(Continued)

FOREIGN PATENT DOCUMENTS

| | | | |
|---|---|---|---|
| CN | 109753287 | A | 5/2019 |
| CN | 113778899 | A | 12/2021 |

(Continued)

OTHER PUBLICATIONS

Walter Cazzola, Dodging Unsafe Update Points in Java Dynamic Software Updating Systems, 2016, pp. 332-341. https://ieeexplore.ieee.org/stamp/stamp.jsp?tp=&arnumber=7774532 (Year: 2016).*

(Continued)

*Primary Examiner* — Mongbao Nguyen

(57) ABSTRACT

Techniques are described herein that are capable of providing or utilizing hot reload functionality which defers detection of certain unsafe edits until run time. A determination is made that the availability of a safe implementation of a requested edit depends on a selection to be made at run time, such as whether an original version of a lambda routine body will be reused. Code is generated to implement a requested change. An exception or other safeguard is installed in or around an implementation of the pre-change (original) version of the code.

20 Claims, 2 Drawing Sheets

(56) References Cited

U.S. PATENT DOCUMENTS

| | | | | |
|---|---|---|---|---|
| 2022/0229659 | A1* | 7/2022 | Chen | G06F 11/1004 |
| 2022/0391541 | A1 | 12/2022 | Novotny et al. | |
| 2023/0019235 | A1 | 1/2023 | Matousek | |
| 2023/0080221 | A1* | 3/2023 | Matousek | G06F 11/3624 717/113 |
| 2024/0020100 | A1* | 1/2024 | Levitt | G06F 8/35 |
| 2025/0004727 | A1* | 1/2025 | Rudnik | G06F 8/33 |
| 2025/0021309 | A1* | 1/2025 | Schmidt | G06F 8/34 |
| 2025/0244959 | A1* | 7/2025 | Schiffman | G06F 8/33 |

FOREIGN PATENT DOCUMENTS

| | | | | | |
|---|---|---|---|---|---|
| CN | 113419741 | A | | 5/2022 | |
| EP | 3974965 | A1 | * | 3/2022 | G06F 9/54 |
| EP | 4027239 | A1 | * | 7/2022 | G06F 11/3636 |
| WO | WO-2022180594 | A1 | * | 9/2022 | G06F 12/084 |

OTHER PUBLICATIONS

Siddhanth Venkateshwaran, Dynamic Software Updates for Unmodified Browsers through Multi-Version Execution, 2021, pp. 1-26. https://arxiv.org/pdf/2106.04655 (Year: 2021).*

Haven Skinner, LiveSim: A Fast Hot Reload Simulator for HDLs, 2020, pp. 1-10. https://ieeexplore.ieee.org/stamp/stamp.jsp?tp=&arnumber=9238634 (Year: 2020).*

Mikelle Rogers, "Hot Reload Supports Modifying Generics!", retrieved from << https://devblogs.microsoft.com/dotnet/hot-reload-generics/ >>, May 18, 2023, 4 pages.

"EnC: Defer lambda rude edit reporting to runtime #70418", retrieved from << https://github.com/dotnet/roslyn/ pull/70418 >>, Oct. 17, 2023, 7 pages.

Bill Horst, "Edit & Continue—Rude Edits", retrieved from << https://devblogs.microsoft.com/vbteam/edit-continue-rude-edits/ >>, Nov. 10, 2005, 2 pages.

Dmitry Lyalin, "Introducing the .NET Hot Reload experience for editing code at runtime", retrieved from << https://devblogs.microsoft.com/dotnet/introducing-net-hot-reload/ >>, May 25, 2021, 3 pages.

"Write and debug running code with Hot Reload in Visual Studio (C#, Visual Basic, C++)", retrieved from << https://learn.microsoft.com/en-us/visualstudio/debugger/hot-reload?view=vs-2022 >>, Dec. 13, 2023, 7 pages.

"Edit and Continue (Visual C#)", retrieved from << https://learn.microsoft.com/en-us/visualstudio/debugger/edit-and-continue-visual-csharp?view=vs-2022 >>, Dec. 13, 2023, 2 pages.

"Lambda expressions in C++", retrieved from << https://learn.microsoft.com/en-us/cpp/cpp/lambda-expressions-in-cpp?view=msvc-170 >>, Feb. 19, 2023, 12 pages.

"Supported Edits in Edit & Continue (EnC) and Hot Reload on .NET 8", retrieved from << https://github.com/dotnet/roslyn/blob/main/docs/wiki/EnC-Supported-Edits.md >>, Jun. 16, 2023, 4 pages.

"Edit running code with Hot Reload", retrieved from << https://www.jetbrains.com/help/rider/Hot_Reload.html >>, Mar. 1, 2024, 5 pages.

"Closure (computer programming)", retrieved from << https://en.wikipedia.org/wiki/Closure_(computer_programming) >>, Feb. 7, 2024, 17 pages.

"Anonymous function", retrieved from << https://en.wikipedia.org/wiki/Anonymous_function >>, Jan. 10, 2024, 39 pages.

"Interface (C# Reference)", retrieved from << https://learn.microsoft.com/en-us/dotnet/csharp/language-reference/keywords/interface >>, Dec. 8, 2022, 6 pages.

"Function pointer", retrieved from << https://en.wikipedia.org/wiki/Function_pointer >>, Jan. 16, 2024, 7 pages.

"Pointer (computer programming)", retrieved from << https://en.wikipedia.org/wiki/Pointer_(computer_programming) >>, Feb. 16, 2024, 24 pages.

"'This' reference in Java", retrieved from << https://www.geeksforgeeks.org/this-reference-in-java/ >>, no later than Mar. 4, 2024, 16 pages.

"Query expression basics", retrieved from << https://learn.microsoft.com/en-us/dotnet/csharp/linq/get-started/query-expression-basics >>, Dec. 15, 2023, 12 pages.

"asp.net Core Razor components", retrieved from << https://learn.microsoft.com/en-us/aspnet/core/blazor/components/?view=aspnetcore-8.0 >>, Feb. 9, 2024, 35 pages.

"Source Generators", retrieved from << https://learn.microsoft.com/en-us/dotnet/csharp/roslyn-sdk/source-generators-overview >>, Jun. 25, 2023, 9 pages.

"Common Language Runtime", retrieved from << https://en.wikipedia.org/wiki/Common_Language_Runtime >>, Nov. 5, 2023, 2 pages.

"Runtime system", retrieved from << https://en.wikipedia.org/wiki/Runtime_system >>, Jan. 24, 2024, 7 pages.

"Build beautiful web apps with Blazor", accessed on link https://dotnet.microsoft.com/en-us/apps/aspnet/web-apps/blazor, retrieved on Mar. 2, 2024, 4 pages.

* cited by examiner

HOT RELOAD EDIT DETERMINATION AT RUN TIME

BACKGROUND

Some computing systems allow a "hot reload" (also called "edit and continue") activity in which a change is made in a program's source code, the edited source code is recompiled to generate a corresponding new version of a portion of the program's executable code, and that portion of the executable code is loaded into a runtime for execution without terminating the current execution instance. That is, the program is not restarted, but instead continues execution using the new version of the executable code.

However, hot reload options are limited. Accordingly, advances in hot reload technology would be beneficial.

SUMMARY

Some embodiments taught herein provide or utilize hot reload functionality, which is also referred to here as edit and continue functionality. Some embodiments: receive an edit request which requests an edit to an original version of a source code, the original version and the edit request specifying an edited version of the source code, the original source code corresponding to a portion of a program which is loaded for execution in a computing system; determine that a safe implementation of the edited version depends on at least a run time selection which is indeterminate in the edited version of the source code; generate the safe implementation of the edited version; install the safe implementation of the edited version into the program as a hot reload; and modify an original version implementation of the source code original version to deny an attempt to execute the original version implementation.

Other technical activities, technical characteristics, and technical benefits pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
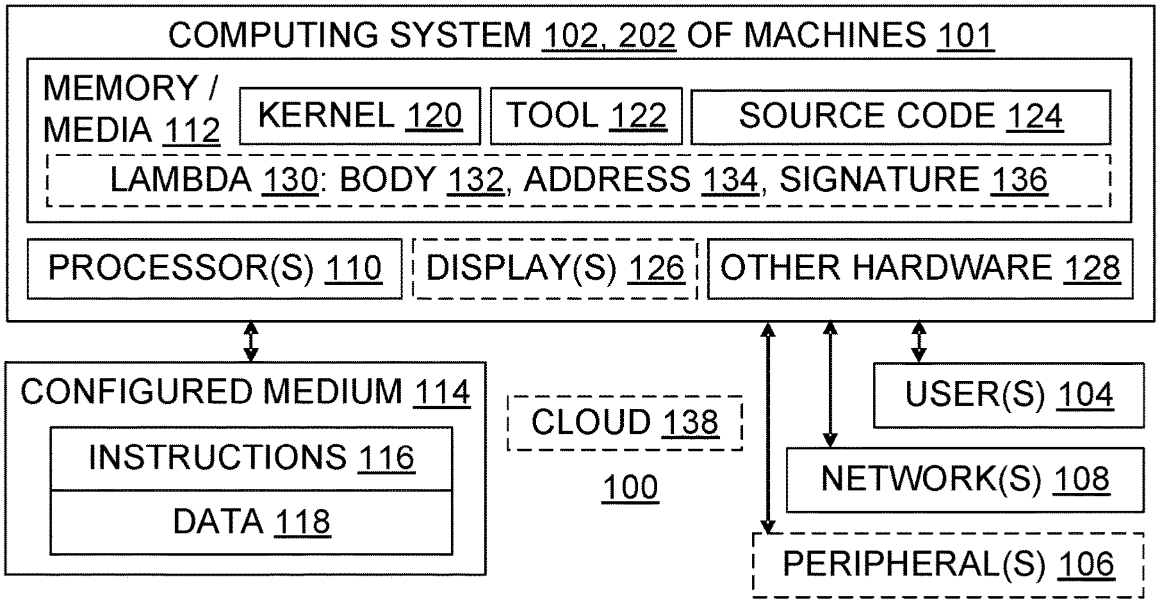
FIG. 1 is a diagram illustrating aspects of computer systems and also illustrating configured storage media, including some aspects generally suitable for embodiments which include or use enhanced hot reload functionality.

Some teachings described herein were motivated by technical challenges faced and insights gained during efforts to improve hot reload technology for debuggers. These challenges and insights provided some motivations, but the teachings herein are not limited in their scope or applicability to these particular tools, motivational challenges, solutions, or insights.

Creating computer software often involves generating executable code from source code. In some scenarios, when a software developer is working on a computer program, and a version of the program's executable code is loaded into a runtime system for execution during an execution instance, the software developer wants to change the program's behavior without terminating the execution instance. Making an edit and then continuing with the same execution instance can save time and effort. Terminating the execution instance, changing the source code, rebuilding the program, reloading the program for execution, and executing the rebuilt program to again reach a program state that is close to the current state, would take a significant amount of developer time, and use significant computational resources.

Some computing systems allow a "hot reload" in which a change is made in the program's source code, the edited source code is recompiled to generate a corresponding new version of a portion of the program's executable code, and that portion of the executable code is loaded into the runtime for execution without terminating the current execution instance. That is, the program is not restarted, but instead continues execution using the new version of the executable code. This activity is referred to as an "edit and continue" activity or a "hot reload" activity.

However, hot reloads are carefully restricted to protect data integrity. Many changes which are permitted when the program is rebuilt and then loaded anew and executed in a new execution instance, are not permitted during a hot reload into the program's current execution instance. In particular, some changes would pose a severe risk of corrupting user data, program data, or system data if they were permitted. Such changes, sometimes called "rude edits", are therefore not permitted as part of hot reload activity, even though the same changes to source code will be permitted and implemented in a re-built version of the program which runs in a subsequent execution instance.

Some embodiments taught herein provide or utilize hot reload functionality which determines that a safe implementation of an edited version of a source code depends on at least a run time selection which is indeterminate in the edited version of the source code, generates the safe implementation of the edited version, installs the safe implementation of the edited version into a program as a hot reload, and modifies an original version implementation of the source code original version to deny an attempt to execute the original version implementation.

This hot reload functionality has the technical benefit of safely allowing changes to code that were previously disallowed as rude edits. Allowing these changes improves developer productivity, and also reduces computational resource usage (CPU, memory, bandwidth, electric power), by avoiding a full rebuild of a program and by avoiding full re-traversal of an execution path that led to a point of interest in an execution instance.

In some embodiments, a safe implementation of an edited version does at least one of: adds a non-static lambda; adds a lambda with a non-captured current object instance reference; adds a lambda configured to upon execution access a non-captured variable; adds a lambda configured to upon execution access captured variables from at least two scopes; includes a modified lambda signature; modifies a membership of a set of variables captured by a lambda; modifies a scope of a variable captured by a lambda; or modifies a membership of a set of variables accessed by a lambda upon execution.

This hot reload functionality has the technical benefit of safely allowing changes to lambdas that were previously disallowed. Lambdas are also called anonymous functions. Previous restrictions on lambdas are lifted, broadening the set of possible edits that are supported via hot load activity. Because lambdas are widely used, broadening the set of supported hot load edits involving lambdas significantly improves developer productivity and reduces computational resource usage.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 138. An individual machine is a computer system, and a network or other non-empty group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, source code generators, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 138 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include source code generators, security tools, or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or non-empty set of accounts, user or non-empty group of users, IP address or non-empty group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components, Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, hot reload functionality 204 could be installed on an air gapped network 108 and then be updated periodically or on occasion using removable media 114, or not be updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, devices, data structures, kinds of data, settings, parameters, components, computational resources, programming languages, tools, workflows, or algorithm implementations, or other items in a computing environment, which are disclosed herein but not associated with a particular reference numeral herein. Corresponding drawings may also be added.

More About Systems

Figure 2:
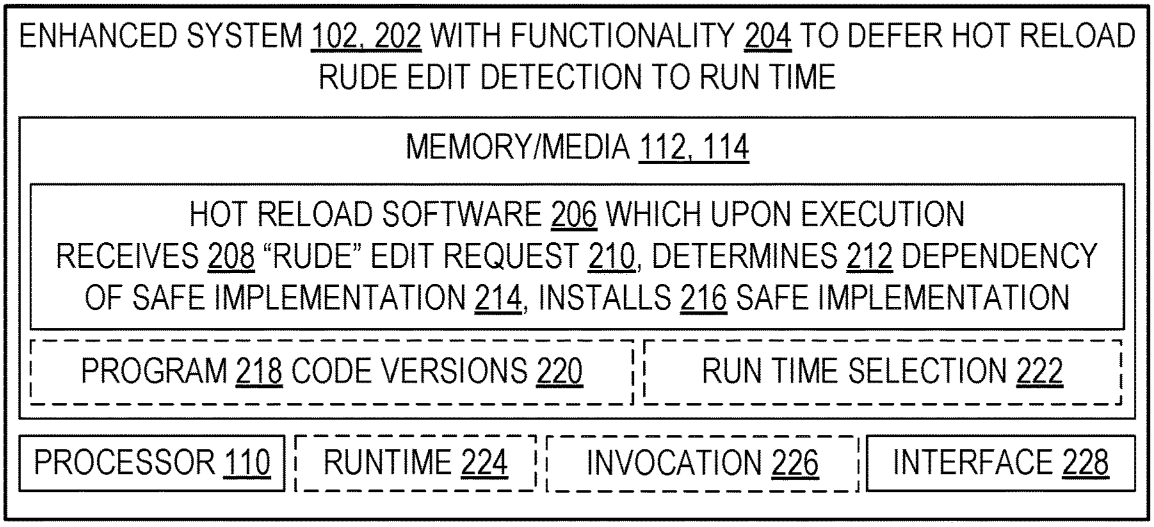
FIG. 2 is a block diagram illustrating aspects of a family of enhanced systems which are each configured with enhanced hot reload functionality.

FIG. 2 illustrates a computing system 102 configured by one or more of the hot reload functionality enhancements taught herein, resulting in an enhanced system 202. FIG. 2 is not a comprehensive summary of all aspects of enhanced systems 202, or all aspects of hot reload functionality 204, or all aspects of an environment 100 or system 202 or other context of an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein.

Figure 3:
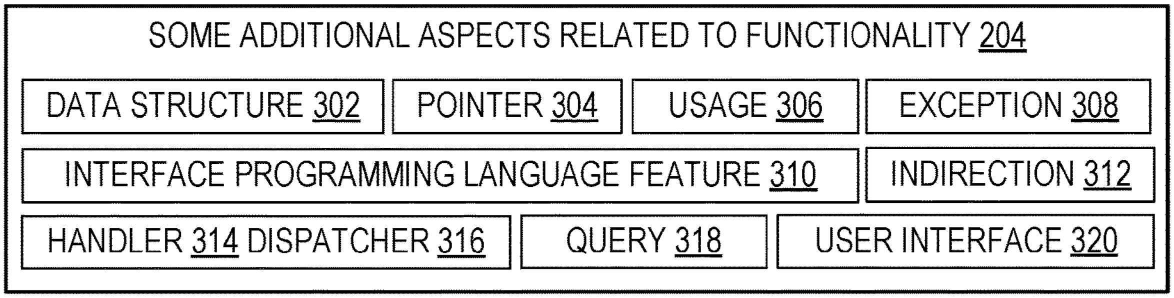
FIG. 3 is a block diagram illustrating some additional aspects of enhanced hot reload functionality.

FIG. 3 shows some additional aspects of hot reload functionality 204. This is not a comprehensive summary of all aspects of hot reload functionality 204. FIG. 3 items are discussed at various points herein.

Figure 4:
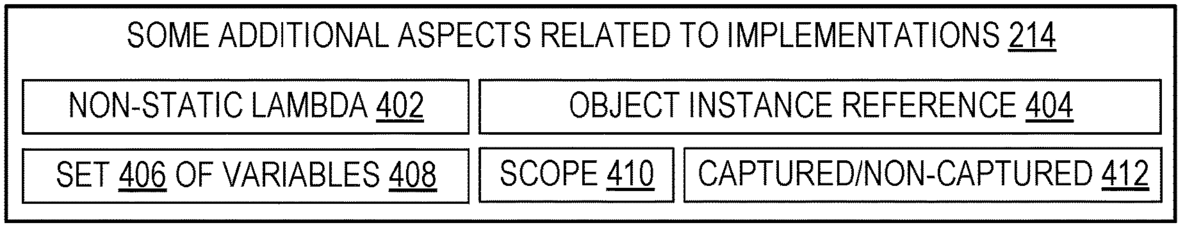
FIG. 4 is a block diagram illustrating some aspects of some implementations of edited code in a hot reload context.

FIG. 4 shows some additional aspects of hot reload functionality 204 code implementations 214. This is not a comprehensive summary of all aspects of hot reload functionality 204 code implementations 214. FIG. 4 items are discussed at various points herein.

Figure 5:
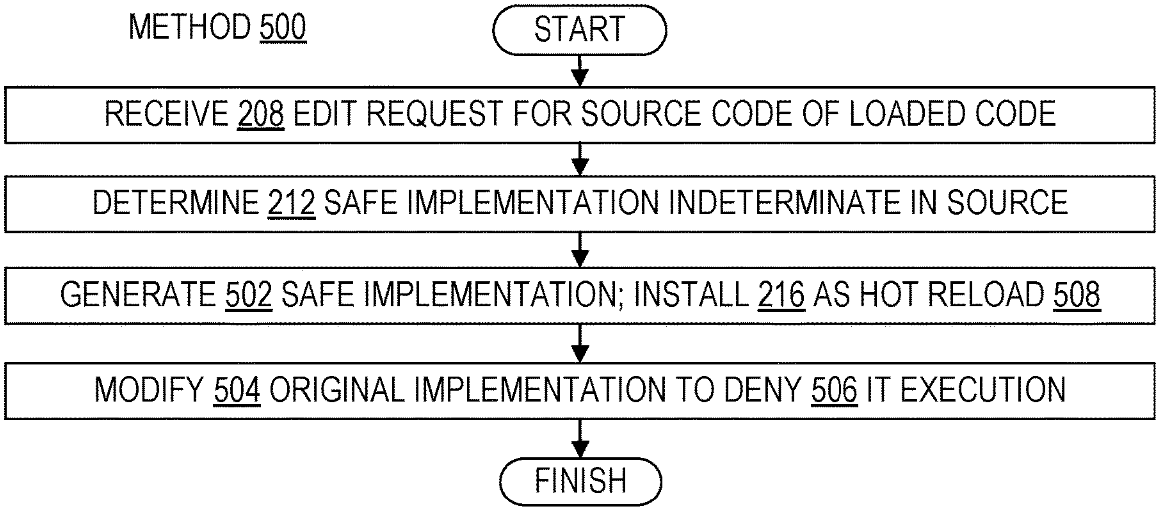
FIG. 5 is a flowchart illustrating some hot reload methods.
Figure 6:
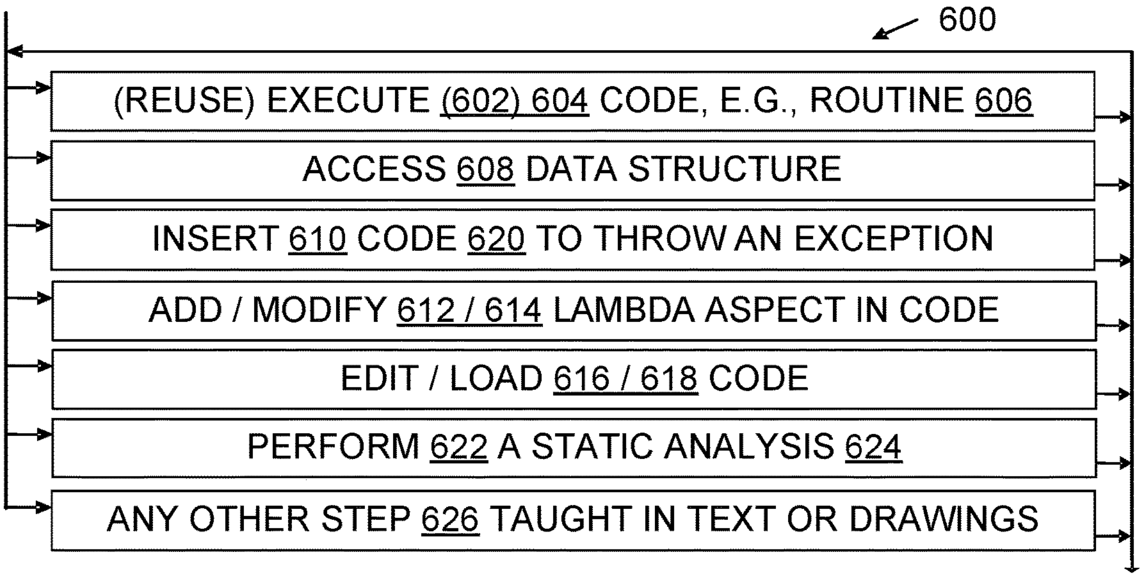
FIG. 6 is a flowchart further illustrating hot reload methods, and incorporating as options the steps of FIGS. 2 and 5.

The other figures are also relevant to systems 202. FIGS. 5 and 6 are flowcharts which illustrate some methods of hot reload functionality 204 operation in some systems 202.

In some embodiments, the enhanced system 202 is networked through an interface 228. In some, an interface 228 includes hardware such as network interface cards, software such as network stacks, APIs, or sockets, combination items such as network connections, or a combination thereof.

Some embodiments include a hot reload computing system 202 which is configured to utilize or provide functionality 204. The system 202 includes a digital memory set 112 including at least one digital memory 112, and a processor set 110 including at least one processor 110. The processor set is in operable communication with the digital memory set. A digital memory set is a set which includes at least one digital memory 112, also referred to as a memory 112. The word "digital" is used to emphasize that the memory 112 is part of a computing system 102, not a human person's memory. The word "set" is used to emphasize that the memory 112 is not necessarily in a single contiguous block or of a single kind, e.g., a memory 112 may include hard drive memory as well as volatile RAM, and may include memories that are physically located on different machines 101. Similarly, the phrase "processor set" is used to emphasize that a processor 110 is not necessarily confined to a single chip or a single machine 101. Sets are non-empty unless described otherwise.

In industry, "function" is sometimes used to describe a block of code that can be called, regardless of whether that code returns a value, but at other times "function" means that a value is returned. To avoid confusion, in the present disclosure "function" refers to callable code that returns a value, and "procedure" refers to callable code that does not return a value. Functions and procedures are examples of "routines". For instance, a "function pointer" is an example of a routine pointer, which is a pointer to (i.e., an address of) a function, which is an example of a routine.

Similarly, a "lambda function" is an example of a lambda routine. A lambda routine is also referred to herein as an "anonymous routine" or simply as a "lambda".

The present disclosure refers to "run time" and also refers to a "runtime". As used herein, "run time" with a space refers to a period of time, which is sometimes also called "execution time". "Runtime" without a space refers to software or a system, e.g., the Common Language Runtime is a runtime. "Runtime" is also referred to as a "runtime system".

In some embodiments, a computing system 202 includes: at least one digital memory 112; at least one processor 110 in operable communication with the at least one digital memory, the at least one processor configured to execute a hot reload method 600, the method including: (a) receiving 208 an edit request 210 which requests an edit to an original version 220 of a source code 124, the original version and the edit request specifying an edited version 220 of the source code, the original source code corresponding to a portion of a program 218 which is loaded 618 for execution in the computing system, (b) determining 212 that a safe implementation 214 of the edited version depends on at least a run time selection 222 which is indeterminate in the edited version of the source code, (c) performing 616 the edit request, (d) generating 502 the safe implementation of the edited version, (e) installing 216 the safe implementation of the edited version into the program as a hot reload 508, including installing a body 132 of a lambda routine 130, and (f) modifying 504 an original version implementation 214 of the source code original version to deny 506 an attempt to execute the original version implementation.

Some embodiments determine 212 that although an implementation of the edited version is not clearly safe under certain run time conditions, there is at least one run time selection which is indeterminate in the edited version of the source code under which the implementation is a safe implementation 214. That is, in some scenarios there are particular run time conditions under which the update is unsafe, but it is possible those particular runtime conditions will not occur in a given execution. Therefore, the embodiment allows the edit to be made but also inserts one or more guards into the implementation which check at run time whether the updated implementation is actually safe during the execution. Some embodiments deny 506 an attempt to execute the original or updated implementation under run time conditions that would render the execution unsafe.

In some embodiments, the safe implementation of the edited version includes code 620 which upon execution does at least one of: adds 612 a non-static lambda 402; adds 612 a lambda 130 with a non-captured 412 current object instance reference 404; adds 612 a lambda 130 configured to upon execution access 608 a non-captured 412 variable 408; adds 612 a lambda 130 configured to upon execution access 608 captured 412 variables 408 from at least two scopes 410. These are some examples of cases where it depends on the run time conditions whether or not the edit can be implemented safely. That is, the scope of some embodiments includes implementation of an edited version whose safety depends on a run time selection 222 that includes at least one of the foregoing listed examples.

In some embodiments, the safe implementation 214 of the edited version includes code 620 which includes a modified lambda signature 136.

In some embodiments, the safe implementation 214 of the edited version includes code 620 which upon execution does at least one of: modifies 614 a membership of a set 406 of variables 408 captured 412 by a lambda 130; modifies 614 a scope 410 of a variable 408 captured 412 by a lambda 130; or modifies 614 a membership of a set 406 of variables 408 accessed 608 by a lambda 130 upon execution. A variable is an example of a data structure.

Other system embodiments are also described herein, either directly or derivable as system versions of described processes or configured media, duly informed by the extensive discussion herein of computing hardware.

Although specific hot reload architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of hot reload functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5 and 6 each illustrate a family of methods 500 and 600 respectively, which are performed or assisted by some enhanced systems, such as some systems 202 or another hot reload functionality enhanced system as taught herein. Method family 500 is a proper subset of method family 600. Moreover, activities identified in FIG. 2 include method steps, e.g., receiving 208 an edit request, determining 212 a dependency of a safe implementation on a run time selection 222, and installing 216 a safe implementation. These method steps are likewise incorporated into method (a.k.a. process) 600. These diagrams and flowcharts are merely examples; as noted elsewhere, any operable combination of steps that are disclosed herein may be part of a given embodiment when called out in a claim.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated. For instance, in some situations a human 104 types or speaks an input which specifies a particular value for a data structure identifier. A result of such input activity is captured in the system 202 as digital text, or captured as digital audio which is then converted to digital text. But no process contemplated as an embodiment herein is entirely manual or purely mental. None of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 6. FIG. 6 is a supplement to the textual and figure drawing examples of embodiments provided herein and the descriptions of embodiments provided herein. In the event of any alleged inconsistency, lack of clarity, or excessive breadth due to an interpretation of FIG. 6, the content of this disclosure shall prevail over that interpretation of FIG. 6.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 600 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 6 to be non-operable, the sequence S is not within the scope of any claim. Any assertion otherwise is contrary to the present disclosure.

Some embodiments provide or utilize a hot reload method 600 in a computing system 102, e.g., in a node 102 of a computer network 108. This method includes automatically: receiving 208 an edit request which requests an edit to an original version of a source code, the original version and the edit request specifying an edited version of the source code, the original source code corresponding to a portion of a program which is loaded for execution in the computing system; determining 212 that a safe implementation of the edited version depends on at least a run time selection which is indeterminate in the edited version of the source code; generating 502 the safe implementation of the edited version; installing 216 the safe implementation of the edited version into the program as a hot reload; and modifying 504 an original version implementation of the source code original version to deny an attempt to execute the original version implementation.

In some embodiments, the run time selection includes a usage 306 selection 222 between (a) executing a lambda only once, and (b) executing the lambda more than once.

In some embodiments, the run time selection includes a selection 222 between (a) executing an in-place modification of the original version implementation, and (b) executing a new instance generated from the edited version.

In some embodiments, the run time selection includes a usage 306 selection 222 between (a) reusing 602 an existing body of a lambda routine, and (b) executing a replacement body of the lambda routine.

In some embodiments, the run time selection includes a selection 222 between (a) accessing 608 data in an internal data structure 302 which is a part of a runtime, and (b) accessing 608 data in an external data structure 302 which resides outside the runtime. In some embodiments, accessing 608 data in the external data structure which resides outside the runtime includes accessing an address 134 of a lambda routine. In some, the address of the lambda routine resides in a handler 314 or resides in a handler dispatcher 316.

In some embodiments, the original version 220 of the source code and the edited version 220 of the source code each include a lambda routine body.

In some embodiments, the original version of the source code and the edited version of the source code each include an invocation 226 of a routine 606 via a routine pointer 304.

In some embodiments, the original version of the source code and the edited version of the source code each include an instance of an interface programming language feature 310, e.g., a C # interface.

In some embodiments, the original version of the source code and the edited version of the source code each include an indirection 312 whose value is indeterminate in the edited version of the source code.

In some embodiments, the original version of the source code and the edited version of the source code each include a language-integrated query expression 318.

In some embodiments, the original version of the source code and the edited version of the source code each include a self-contained portion of a user interface 320 which includes a processing logic 620 to enable a dynamic behavior.

In some embodiments, modifying 504 the original version implementation includes inserting 610 a code 620 which is configured to upon execution throw an exception 308.

In some embodiments, the safe implementation of the edited version does at least N (1<=N<=8) of: adds 612 a non-static lambda; adds 612 a lambda with a non-captured current object instance reference (e.g., a non-captured "this"); adds 612 a lambda configured to upon execution access a non-captured variable; adds 612 a lambda configured to upon execution access captured variables from at least two scopes; includes a modified lambda signature; modifies 614 a membership of a set of variables captured by a lambda; modifies 614 a scope of a variable captured by a lambda; or modifies 614 a membership of a set of variables accessed by a lambda upon execution.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is removable or not, and is volatile or not, depending on the embodiment, can be configured in the embodiment using items such as lambda bodies 132, addresses 134, lambda signatures 136, code versions 220, data structures 302, exceptions 308, and hot reload software 206, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing hot reload functionality 204 as disclosed herein. The Figures thus help illustrate configured storage media embodiments and process (a.k.a. method) embodiments, as well as system and process embodiments. In particular, any of the method steps illustrated in any of the Figures, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a hot reload method 600 in a computing system. This method 600 includes automatically: receiving 208 an edit request which requests an edit to an original version of a source code, the original version and the edit request specifying an edited version of the source code, the original source code corresponding to a portion of a program which is loaded for execution in the computing system; determining 212 that a safe implementation of the edited version depends on at least a run time selection which is indeterminate in the edited version of the source code; generating 502 the safe implementation of the edited version; installing 216 the safe implementation of the edited version into the program as a hot reload; and modifying 504 an original version implementation of the source code original version to throw an exception in response to an attempt to execute 604 the original version implementation.

Additional Observations

Additional support for the discussion of hot reload functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. It is in the context of this understanding, which pertains to all parts of the present disclosure, that examples and observations are offered herein.

Edit and continue is a feature of some debuggers 122 that permits a developer to make changes to a program while it's being debugged; the new code the developer wrote or changed is used for the remainder of that program's execution, without needing to restart the program. In effect, the in-memory assembly code for a program is edited as it's being debugged, although the developer directs the edit by editing the higher-level language code.

"Hot Reload" is a name also given to various technologies which allow the developer of an application to change the code while the application is running and apply the changes to the running application without restarting it. Certain changes made to a running application might result in data corruption or behavior change to the application that is difficult to anticipate. Often, a hot reload technology therefore prudently blocks these kind of changes (sometimes referred to as "rude edits") and reports an error to the developer.

In order to determine which kind of changes are allowed, in some scenarios a static analysis is performed on the changed code. In certain cases, the static analysis does not have enough information to determine whether a particular change would actually result in unwanted application behavior if applied. The static analysis is conservative in that it blocks these changes in order to preserve safe application behavior even though the changes would have been safe if applied in conjunction with a program rebuild and relaunch. As a result, the response to the static analysis result unnecessarily prevents the developer from changing their application via hot reload. Moreover, in some scenarios the changes would also have been safe if applied to the running application, if certain run time conditions (that make them unsafe) do not occur.

Some embodiments address this shortcoming by deferring to run time the decision of whether or not to allow certain kinds of changes to take effect. The static analysis identifies changes that may potentially be "rude edits" if they took effect. Rather than blocking the edits entirely, an embodiment allows them to be made and applied to the application without requiring a program rebuild and restart. When the changes are compiled to an intermediate representation that is eventually compiled to machine code by the runtime system, the embodiment instructs a compiler to emit additional guard checks around the changes made per the developer's edit commands. The guards perform additional validation at run time, when more information is available than the info available to the static analysis, and the system 202 only allows the guarded changes to take effect if they are determined to be safe. The embodiment thus allows a Hot Reload feature (a.k.a. Edit and Continue feature) to apply more changes than would otherwise be possible by only relying on static analysis for validating the safety and other soundness of a code change.

As an example, one embodiment applies this functionality 204 to changes that involve lambda expressions, LINQ queries 318 and local functions in a C # programing language, as well as lambda expressions 130 and LINQ queries in a Visual Basic programming language. However, teachings herein are not limited to these scenarios and can be applied more broadly to other programming language constructs and other programming languages. LINQ expressions are a way to evaluate programming language expressions; a given embodiment may also or instead use other mechanisms.

More generally, hot reloads save developer time and computational resources by allowing changes to code whose execution 604 is underway (albeit possibly suspended). However, certain kinds of "rude" edits have been prohibited as unsafe. Some embodiments taught herein allow some of these edits to be made, in part by deferring the determination of rudeness from edit time to run time.

In particular, some embodiments permit or perform changes to lambdas that were previously disallowed as "rude edits". Lambdas are also referred to as anonymous functions.

In some scenarios involving tools that lack functionality 204, lambda expressions could only be added via hot reload when they were static, when access to the "this" reference had already been captured, and when the lambda only accessed captured variables from a single scope. The "this" reference is an object instance reference 404.

In some scenarios lacking functionality 204, hot reload technology enforced certain rules to guarantee that the structure of an emitted closure tree would not change, thus ensuring that lambdas in a new body are mapped to the corresponding generated runtime methods that implemented their previous versions. Under these rules, (a) lambda signatures could not be modified (this prohibited changes to any of: types, ref-ness of parameters, or return types), (b) the set of variables captured by the lambda expression could not be modified (a variable that had not been captured before could not be captured after modification and vice versa), (c) the scope of captured variables could not be modified, and (d) the set of captured variables accessed by the lambda expression could not be modified. Moreover, because LINQ expressions contain implicitly-declared anonymous functions, the restrictions on lambda hot reload edits were also enforced against LINQ hot reload edits.

By contrast, embodiments enhanced with hot reload functionality 204 are freed from one or more of these restrictive rules, without increasing the risk of data corruption from a hot reloaded change. The foregoing restrictions are only prudent for code safety if the program is using lambdas in certain ways, such as when a lambda is stored in a data structure of the program that is not controlled through the code that corresponds to the source code being edited, and when the lambda is also reused by the program.

In one example, the lambda is used as a handler of a button click event. The address of the lambda body is stored in an external button click data structure, e.g., in the handler dispatcher or a handler preprocessing portion, out of the control of the lambda itself. Whether the original lambda body is reused (re-invoked) is not determined by static analysis, but rather is dependent on a selection 222 made at run time. If the body is reused 602, then the pointer in the external data structure will still point to the original lambda body, not to a modified new lambda body. Therefore, the embodiment inserts an exception raising instruction in the original body to notify the developer that the edit is not being implemented. On the other hand, if the original lambda body is not reused, then the edit is implemented in a new instance of the lambda body which reflects the edit, and resides at a different address than the original lambda body.

In other words, an insight reflected by some embodiments is that the earlier restrictions noted above are only prudent for safe operation if an application is using lambdas in certain ways, whereby a lambda is stored in a data structure of the application that is beyond the developer's control and is reused by the application (e.g., the lambda is used as a handler of a button click event). If the application used the lambda only once and the next time the code is executed 604 a new lambda body was created, the restrictions are unnecessary. The runtime structure of the state the lambda operates on does not need to be mapped to the previous state.

Static code analysis does not generally have sufficient information to distinguish between these two use cases for any given lambda. Therefore, to be safe, prior technology conservatively applied the above restrictions to all lambdas. Embodiments taught herein shift the determination of whether or not an update of a lambda is safe from static analysis time to run time, where the reuse information is available. Some embodiments optimistically apply changes without the above restrictions. The update is accompanied with a run time check that throws an exception if the code path that would require unsupported mapping to the previous state is executed.

As a result, some embodiments allow higher-level constructs that translate (i.e., compile, interpret) to lambdas to be updated at run time. A developer does not necessarily always know from the source code that lambdas will be part of executable code that implements the source code. Some examples of these higher-level constructs are LINQ expressions and Razor™ (mark of Microsoft Corporation) components. For example, a user interface of some Blazor™ (mark of Progress Software Corporation) applications are described using a combination of C # and XML (eXtensible Markup Language) syntax that take advantage of Razor components. A Razor component can be used to render a table in a web page like so:

```
<Table>
  <RowTemplate>@context</RowTemplate>
</Table>
```

The <RowTemplate>@context</RowTemplate>code fragment is translated by a source generator to pure C # code containing lambdas:

```
__builder.AddAttribute(
  8,
  "RowTemplate",
  new
    Microsoft.AspNetCore.Components.RenderFragment<string>
    ((context)=>(__builder2)=>{_builder2.AddContent
    (9, context);}));
```

Because all lambdas produced by the Razor™ source generator are in the category of "used once" lambdas, the run time check inserted by some embodiments never throws an exception. Thus, the teachings herein completely eliminate lambda rude edits that were previously reported and disallowed for Razor components. More generally, teachings herein are beneficial in hot reload tools for programming languages such as C #, Java, .NET, F #, COBOL, or .NET running on runtimes that utilize JIT compilation, garbage collection, or both.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as installing 216 a hot reload code change in a program 218 that is loaded for execution, inserting 610 instruction(s) 116 that will throw an exception 308, or performing 622 a static analysis 624, which are each an activity deeply rooted in computing technology. Some of the technical mechanisms discussed include, e.g., lambdas 130, runtime systems 224, development tools 122, data structures 302, and hot reload software 206. Some of the technical effects discussed include, e.g., safe performance of previously barred hot reload edits, reduced consumption of computational resources to execute variations of a program, and deferral of rude edit detection from edit time or static analysis time to run time. Thus, purely mental processes and activities limited to pen-and-paper are clearly excluded from the scope of any embodiment. Other advantages based on the technical characteristics of the teachings will also be apparent to one of skill from the description provided.

One of skill understands that generation 212 and installation 216 of code 620 outside the direct view and control of a human, in a computing network 108 or other computing system 102, is technical activity which cannot be performed mentally at all, and cannot be performed manually with the speed and accuracy required in computing systems. Hence, hot reload improvements such as the various examples of hot reload functionality 204 described herein are improvements to computing technology. One of skill understands that attempting to manually install code changes into a program while the program's execution is underway would very likely introduce errors causing data corruption and delays in software development. People manifestly lack the speed, accuracy, memory capacity, and specific processing capabilities required to perform automated hot reload methods 600 as taught herein.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as a debugger 122, a code generator 122 (e.g., in a JIT compiler or an interpreter), a Roslyn™ tool 122 (an open-source part of some Visual Studio® products) (marks of Microsoft Corporation) hosted on the GitHub® repository (mark of GitHub, Inc.), or an SDK such as a .NET™ SDK (mark of Microsoft Corporation). However, practical applications of the teachings herein are not technologically limited to any particular vendor's products and services.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to safeguard data integrity during hot reload activity, how to conserve computational resources by using hot reloads, how to detect rude (unsafe) edits during hot reload activity, and how to increase the collection of available and safe hot reload edits. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, language models, prompts, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array FPU: floating point processing unit
GDPR: General Data Protection Regulation
GPU: graphical processing unit
GUI: graphical user interface
HTTPS: hypertext transfer protocol, secure
iaaS or IAAS: infrastructure-as-a-service
JIT: just-in-time
LAN: local area network
LINQ: language-integrated query.
OS: operating system
PaaS or PAAS: platform-as-a-service
RAM: random access memory
ROM: read only memory
SDK: software development kit.
SIEM: security information and event management
TPU: tensor processing unit
UEFI: Unified Extensible Firmware Interface
UI: user interface
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" as a noun means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (iaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account or user session, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or a user session or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "method"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Hit reload operations such as modifying 504 an original implementation 214, and many other operations discussed herein (whether recited in the Figures or not), are understood to be inherently digital and computational. A human mind cannot interface directly with a CPU or other processor, or with RAM or other digital storage, to read and write the necessary data to perform the hot reload steps 600 taught herein even in a hypothetical situation or a prototype situation, much less in an embodiment's real world large computing environment, e.g., an internet-connected environment. This would all be well understood by persons of skill in the art in view of the present disclosure. Moreover, one of skill understands that hot reload functionality cannot be implemented using merely with conventional tools and steps, because actual implementation requires modifying 504, 216 the code instructions 116 stored in a computer memory 112, and other teachings which were first provided in the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, adding, analyzing, building, capturing, compiling, denying, determining, controlling, editing, executing, generating, implementing, inserting, installing, invoking, loading, modifying, performing, receiving, relaunching, reloading, restarting, reusing, throwing (and accesses, accessed, adds, added, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Remarks Regarding Reference Numerals

Reference numerals are provided for convenience and in support of the drawing figures and as part of the text of the specification, which collectively describe aspects of embodiments by reference to multiple items. Items which do not have a unique reference numeral may nonetheless be part of a given embodiment. For better legibility of the text, a given reference numeral is recited near some, but not all, recitations of the referenced item in the text. The same reference numeral may be used with reference to different examples or different instances of a given item.

The following remarks pertain to particular reference numerals:

100 operating environment, also referred to as computing environment; includes one or more systems 102

101 machine in a system 102, e.g., any device having at least a processor 110 and having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or non-empty set of processors; includes hardware

112 computer-readable storage medium, e.g., RAM, hard disks; also referred to as storage device

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; hardware tools; computational

124 source code, as represented within a computing system and hence digital

126 display screens, also referred to as "displays"

128 computing hardware not otherwise associated with a reference numeral 106, 108, 110, 112, 114

130 lambda routine, as represented within a computing system and hence digital

138 cloud, also referred to as cloud environment or cloud computing environment

202 enhanced computing system, i.e., system 102 enhanced with functionality 204 as taught herein

204 hot reload functionality (also referred to as edit and continue functionality 204, or functionality 204), e.g., software or specialized hardware which performs or is configured to perform steps 502 and 516, or steps 216 and 504, or any software or hardware which performs or is configured to perform a hot reload activity first disclosed herein, or to perform a novel method 600 first disclosed herein

500 flowchart; 500 also refers to hot reload methods that are illustrated by or consistent with the FIG. 5 flowchart or any variation of the FIG. 5 flowchart described herein; all hot reload method steps are computational, not human activity

600 flowchart; 600 also refers to hot reload methods that are illustrated by or consistent with the FIG. 6 flowchart, which incorporates the FIG. 5 flowchart and all other steps taught herein, or methods that are illustrated by or consistent with any variation of the FIG. 6 flowchart described herein; all method steps are computational, not human activity

626 any step or item discussed in the present disclosure that has not been assigned some other reference numeral; 626 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments provide or utilize hot reload functionality which defers detection of certain unsafe edits until run time. Some embodiments determine that the availability of a safe implementation of a requested edit depends on a selection to be made at run time, such as whether an original version of a lambda routine body will be reused. Some embodiments optimistically generate code to implement a requested change, and install an exception or other safeguard in or around an implementation of the pre-change (original) version of the code.

Embodiments are understood to also themselves include or benefit from tested and appropriate security controls and privacy controls such as the General Data Protection Regulation (GDPR). Use of the tools and techniques taught herein can be used together with such controls.

Although technology of particular vendors is used in some motivating examples, the teachings herein are not limited to use in technology supplied or administered by any particular vendor. Under a suitable license, for example, the present teachings could be embodied in software or services provided by various software development solution providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method performed in a computing system, the method comprising automatically:

receiving an edit request which requests an edit to an original version of source code, the edit request specifying an edited version of the source code relative to the original version, the original version of the source code corresponding to a portion of a program which is loaded for execution in the computing system;

determining that a safe implementation of the edited version of the source code depends on at least a run time selection which is indeterminate in the edited version of the source code;

generating the safe implementation of the edited version of the source code, the safe implementation comprising executable code configured to perform a run time check during execution of the program;

installing the safe implementation of the edited version of the source code into the program as a hot reload during execution of the program, such that subsequent execution of the portion of the program invokes the safe implementation; and modifying an original version implementation of the source code to deny, during execution of the program, an attempt to execute the original version implementation that occurs after installation of the safe implementation.

2. The method of claim 1, wherein the run time selection includes a selection between (a) executing a lambda only once, and (b) executing the lambda more than once.

3. The method of claim 1, wherein the run time selection includes a selection between (a) executing an in-place modification of the original version implementation, and (b) executing a new instance generated from the edited version.

4. The method of claim 1, wherein the run time selection includes a selection between (a) reusing an existing body of a lambda routine, and (b) executing a replacement body of the lambda routine.

5. The method of claim 1, wherein the run time selection includes a selection between (a) accessing data in a first data structure which is a part of a runtime, and (b) accessing data in a second data structure which resides outside the runtime.

6. The method of claim 5, wherein accessing data in the second data structure which resides outside the runtime comprises accessing an address of a lambda routine.

7. The method of claim 6, wherein the address of the lambda routine resides in a handler or resides in a handler dispatcher.

8. The method of claim 1, wherein each of the original version of the source code and the edited version of the source code comprises at least one of a lambda routine body, an invocation of a routine via a routine pointer, or an instance of an interface programming language feature.

9. The method of claim 1, wherein each of the original version of the source code and the edited version of the source code comprises an indirection, and wherein a value of the indirection in the edited version of the source code is indeterminate.

10. The method of claim 1, wherein each of the original version of the source code and the edited version of the source code comprises a language-integrated query expression.

11. The method of claim 1, wherein each of the original version of the source code and the edited version of the source code comprises a self-contained portion of a user interface which includes processing logic to enable a dynamic behavior.

12. The method of claim 1, wherein modifying the original version implementation comprises:

inserting code which is configured to upon execution throw an exception.

13. The method of claim 1, wherein the safe implementation of the edited version comprises code which upon execution performs at least one of:

adds a non-static lambda;

adds a lambda with a non-captured current object instance reference;

adds a lambda configured to upon execution access a non-captured variable;

adds a lambda configured to upon execution access captured variables from at least two scopes;

includes a modified lambda signature;

modifies a membership of a set of variables captured by a lambda;

modifies a scope of a variable captured by a lambda; or modifies a membership of a set of variables accessed by a lambda upon execution.

14. The method of claim 1, wherein the safe implementation comprises:

the executable code configured, upon execution during the program, to perform the run time check that determines whether execution of the edited version of the source code satisfies a safety criterion under the run time selection.

15. A computing system, comprising:

at least one digital memory;

at least one processor in operable communication with the at least one digital memory, the at least one processor configured to execute a hot reload method, the method comprising:

receiving an edit request which requests an edit to an original version of source code, the edit request specifying an edited version of the source code relative to the original version, the original version of the source code corresponding to a portion of a program which is loaded for execution in the computing system;

determining that a safe implementation of the edited version of the source code depends on at least a run time selection which is indeterminate in the edited version of the source code;

performing the edit request;

generating the safe implementation of the edited version of the source code, the safe implementation comprising executable code configured to perform a run time check during execution of the program;

installing the safe implementation of the edited version of the source code into the program as a hot reload, including installing a body of a lambda routine, during execution of the program, such that subsequent execution of the portion of the program invokes the safe implementation; and modifying an original version implementation of the source code to deny, during execution of the program, an attempt to execute the original version implementation that occurs after installation of the safe implementation.

16. The computing system of claim 15, wherein the safe implementation of the edited version comprises code which upon execution performs at least one of:

adds a non-static lambda;

adds a lambda with a non-captured current object instance reference;

adds a lambda configured to upon execution access a non-captured variable;

adds a lambda configured to upon execution access captured variables from at least two scopes.

17. The computing system of claim 15, wherein the safe implementation of the edited version comprises code which includes a modified lambda signature.

18. The computing system of claim 15, wherein the safe implementation of the edited version comprises code which upon execution performs at least one of:

modifies a membership of a set of variables captured by a lambda;

modifies a scope of a variable captured by a lambda; or modifies a membership of a set of variables accessed by a lambda upon execution.

19. The computing system of claim 15, wherein the safe implementation comprises:

the executable code configured, upon execution during the program, to perform the run time check that determines whether execution of the edited version of the source code satisfies a safety criterion under the run time selection.

20. A computer-readable storage device configured with data and instructions which upon execution by a processor perform operations, the operations comprising automatically:

receiving an edit request which requests an edit to an original version of a source code, the edit request specifying an edited version of the source code relative to the original version, the original version of the source code corresponding to a portion of a program which is loaded for execution in a computing system;

determining that a safe implementation of the edited version of the source code depends on at least a run time selection which is indeterminate in the edited version of the source code;

generating the safe implementation of the edited version of the source code, the safe implementation comprising executable code configured to perform a run time check during execution of the program;

installing the safe implementation of the edited version of the source code into the program as a hot reload during execution of the program, such that subsequent execution of the portion of the program invokes the safe implementation; and modifying an original version implementation of the source code to throw an exception, during execution of the program, in response to an attempt to execute the original version implementation that occurs after installation of the safe implementation.

* * * * *